United States Patent

Hawrylko et al.

Patent Number: 5,496,630
Date of Patent: Mar. 5, 1996

[54] THERMOPLASTIC MULTILAYER LOUVER WITH A POLISHED METAL LOOK

[75] Inventors: Roman B. Hawrylko, Avon Lake; Karl Lakstigala; Aslim A. Asgaralli, both of Sheffield Lake, all of Ohio

[73] Assignee: The Geon Company, Cleveland, Ohio

[21] Appl. No.: 76,328

[22] Filed: Sep. 13, 1993

[51] Int. Cl.$^6$ .................................................. B32B 5/02
[52] U.S. Cl. ......................... 428/328; 428/323; 49/74.1; 49/92.1
[58] Field of Search ........................... 428/323, 328, 428/424.6; 49/74.1, 92.1; 160/236

[56] References Cited

U.S. PATENT DOCUMENTS

| | | | |
|---|---|---|---|
| 3,951,679 | 3/1974 | Bernhard et al. | 106/291 |
| 4,049,038 | 4/1976 | Hyman et al. | 160/166 |
| 4,146,403 | 4/1978 | Armanini | 106/291 |
| 4,195,680 | 8/1978 | Hyman et al. | 160/166 |
| 4,416,940 | 11/1981 | Loyle et al. | 428/324 |
| 4,551,491 | 12/1984 | Panush | 524/31 |
| 4,968,351 | 11/1988 | Ahmed et al. | 106/402 |
| 5,132,148 | 7/1992 | Reafler | 427/393.5 |
| 5,194,209 | 3/1992 | Schwaegerle | 264/132 |

*Primary Examiner*—Paul J. Thibodeau
*Assistant Examiner*—David Abraham
*Attorney, Agent, or Firm*—Miles B. Dearth

[57] ABSTRACT

Multilayered extruded thermoplastic profiles are disclosed. The profiles are useful for decorative extruded louvers exhibiting a polished metal-look. The metal-look is achieved by the use of a limited amount of powdered aluminum metal having particle size of 50 microns or less, combined with an effective amount of nacreous pigment. The invention provides a multi-layer extrudate having the appearance of polished metal in the appearance layer in combination with an opaque or clear base layer. The preferred embodiment is a co-extruded polyvinyl chloride.

Preferably, the appearance layer comprises 100 weight parts of rigid polyvinyl chloride as the thermoplastic matrix, a combination of from 0.05 to about 4 parts by weight of aluminum particles having an average particle size of from 10–40 microns, from 0.1 to 5 weight parts of titanium dioxide coated mica pigment or colored version thereof, and optional organic or inorganic coloring pigment(s). Various other compounding components are preferably included in the appearance layer which do not interfere with the appearance and provide proper processing and physical properties. A limited melt processing window is available to sufficiently work the compound without destroying the pigments components.

In a preferred embodiment a multilayered polished metal-look louver profile is made in a manner to provide consistency of quality, reduced material cost and improved melt processing properties by processing under conditions which do not destroy the visual effects of the combined dispersed pigment/metal powder components. Louvers exhibiting enhanced face-to-flop color change is made by incorporating micronized titanium dioxide, aluminum powder, and nacreous pigment.

9 Claims, 2 Drawing Sheets

THERMOPLASTIC MULTILAYER LOUVER WITH A POLISHED METAL LOOK

FIELD OF THE INVENTION

The invention relates to the field of thermoplastic polyvinyl chloride extrusions in the shape of vertical blinds.

BACKGROUND OF THE INVENTION

Over the last few decades, decorative extruded thermoplastic articles have gained wide consumer acceptance in place of natural wood and metal or manufactured as a components of wood, metal or textile-based articles. Typical decorative trims comprise elongated, extruded profiles or sheets. The applications for these extrudates have been exploited in three principal commercial areas, namely interior and exterior construction, and automotive. Exterior construction components include siding, soffit, window exterior panels and trim pieces, and patio furniture. Interior uses include furniture, office partitions, window trim, wall panels, wall trim pieces and ceiling panel assemblies.

Interior vertical window blinds comprise narrow elongated slats which are arranged to overlap slightly and rotated in unison to adjust the light or view through the window opening. The slats are made from a variety of materials such as aluminum or extruded vinyl strips and are optionally decorated by attaching webs, paint or narrow woven fabrics. Vertical slat assemblies can be designed with decorative features such as combinations of a slat member and a decorative film attached thereupon to the face, back or both sides. The vertical louver described in U.S. Pat. No. 4,049,038('038) comprises lateral inwardly facing attachment means which are flanges for receiving an insert such as a strip of wallpaper or fabric. U.S. Pat. No. 4,628,980('980) discloses a louver of identical shape to '038 but incorporates co-extruded transparent flanges. U.S. Pat. No. 4,195,680 discloses decorative attachments to an '038 flanged louver comprising one or more multiple clear or translucent tinted film inserts which allow convenient color changes.

U.S. Pat. No. 4,877,077 ('077) discloses a vertical louver made from co-extruded vinyl thermoplastic wherein a transparent outer layer containing a pearlescent pigment is co-extruded with an opaque base layer. The opaque base layer is visible and reflects light through the pearlescent surface layer. Optionally, a transparent or translucent tinting color dye is incorporated in the outer layer. An opacified pearlescent louver is disclosed in U.S. Pat. No. 5,194,209.

The use of metallic powders as dispersions in polymeric liquids for simulating weathered copper is disclosed in U.S. Pat. No. 4,416,940. A base coat-top coat method is taught wherein a patina-color is applied in a base coat followed by top coating with copper colored, coated mica. The greenish patina with the overlying pearlescent mica provides an appearance of weathered copper, a simulation of the aged elemental metal but which does not change shades as the metal does. The liquid film forming binders taught in '940 include thermosetting vinyls, halogenated vinyls, polyhalogenated vinyls, styrenes, acrylics, polyesters, urethanes, and mixtures.

The use of metallic pigments is prominent in automotive finishes and trim pieces. Color matching of trim pieces to the body panel is achieved by the use of colored plasticized PVC films which may be laminated over a substrate. These flexible films are also coextruded with other base compounds for economical savings by utilizing small amounts of metallic or pearlescent pigments only in the thin outer flexible skin.

A decorative film on a thermoplastic core strip is disclosed for automotive trim strips in U.S. Pat. No. 4,978,490. A solid non-weatherable PVC is suggested for the thermoplastic core. The outer layer is injection molded thermoplastic and molded with the core placed within the mold. The gist of '490 is the shaping and cutting of the core piece to less than a predetermined length, separately forming end pieces, and molding the outer appearance layer.

There are dispersion and settling problems attendant in the use of powdered metal flakes for paints. The pearlescent pigments have been used in paints, in place of metallic pigments. U.S. Pat. No. 4,551,491 teaches a base coat-clear coat in which an iron oxide treated mica is contained in the base coat. The base coat is overcoated with a transparent thermoplastic or thermosetting liquid resin. These metal powders are suitable for use with low viscosity plasticized PVC, PVC plastisol or paint vehicles but present unique problems when one attempts their use in a rigid, thermoplastic PVC matrix.

Contrasted with the paint methods and flexible thermoplastics employing metallic powder where only low shear forces exist, rigid thermoplastic resins flow only under heat and pressure wherein high shear forces develop. Metallic pigments are fragile and break down readily under high shear forces. Improved spheroidal shaped aluminum powder in certain instances may withstand the shearing action when dispersed in a thermoplastic resin under melt-flow conditions.

The various decorative thermoplastic louvers of the prior art have the appearance of colored plastic or pearlescence. It would be desirable to obtain an appearance for a rigid thermoplastic louver which simulates a buffed or polished metal look. In the thermoplastic extrusion of louvers from rigid polyvinyl chloride compound containing of aluminum fine particles it has been observed that the hot, viscous PVC extrusion readily smokes or ignites as it exits the extruder die, since aluminum metal powder is flammable. Moreover, in the use of aluminum particles, certain sized particles tend to plug in-line extrusion filter packs causing interruption of continuous processing. It would be desirable to achieve continuous manufacture of rigid louver profiles having the look of polished metal without the hazards due to burning under high shear.

SUMMARY OF THE INVENTION

The invention pertains to a method of use of powdered aluminum metal in a rigid thermoplastic polyvinyl chloride extruded louver, comprising the incorporation of at least 0.1 weight parts into 100 weight parts of rigid polyvinyl chloride, the metal having a average particle size no more than about 50 microns, and wherein the amount of powdered aluminum metal does not exceed about 4 weight parts per 100 weight parts of polyvinyl chloride, and further comprising the incorporation of nacreous (pearlescent) pigment at a level of from 0.05 to 10 weight parts.

The invention also pertains to a rigid extruded thermoplastic PVC appearance compound for louvers exhibiting a polished metal-look and achievable without processing difficulties in the use of fine powdered metals such as aluminum. The appearance is produced by combining aluminum metal powder of limited particle size with an effective amount of nacreous pigment. The method of compounding minimizes the destructive shearing action so as to preserve the specular reflection and the pearlescent layered effect. The invention provides for multi-layer extrudates having the look of polished metal in the appearance layer. The appearance layer is permanently joined on one or both sides of an extruded opaque or clear base which is preferably made of rigid PVC. A clear extrusion layer can be optionally applied over the appearance layer for added gloss and depth of color.

Specifically, the appearance layer comprises 100 weight parts of polyvinyl chloride as the thermoplastic matrix, a combination of from 0.05 to about 4 parts by weight of aluminum particles having a average particle size of about 50 microns or less, from 0.05 to 10 weight parts of a nacreous pigment such as a titanium dioxide coated mica or colored version thereof. A variety of colors can be made using optional organic and/or inorganic coloring pigment(s). Various other compounding components are preferably included which do not interfere with the appearance and provide proper processing and physical properties.

It is a further aspect of the present invention to provide a polished metal-look extrudate made in a manner to provide consistency of quality, reduced material cost and improved melt processing properties by processing under conditions which do not destroy the visual effects of the combined dispersed nacreous pigment/metal powder components.

It is still another aspect of the present invention to provide a combination of an interference type nacreous pigment and powdered aluminum metal which imparts an interference color pattern in the louver: A face-to-flop color change is detected as one varies the angle of view of the louver surface.

It is yet another aspect of the present invention to provide a louver blind comprising an appearance layer which exhibits enhanced face-to-flop color change within a narrower change in the angle of view. The effect is provided by the use of ultra fine titanium dioxide in combination with metallic aluminum powder and nacreous pigment.

DESCRIPTION OF THE PREFERRED EMBODIMENTS

Figure 1:
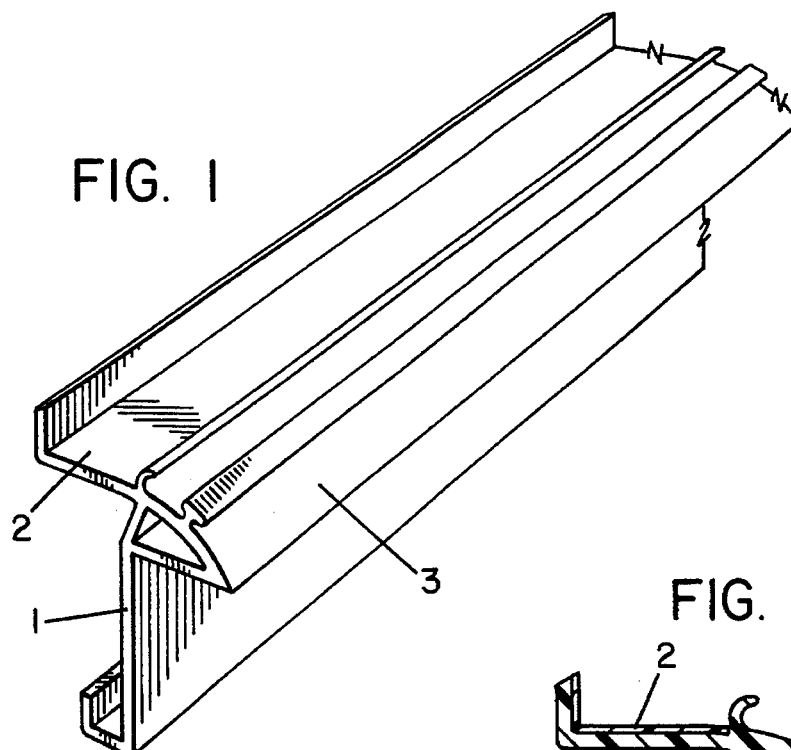
FIG. 1 is a perspective view of an extruded profile.
Figure 2:
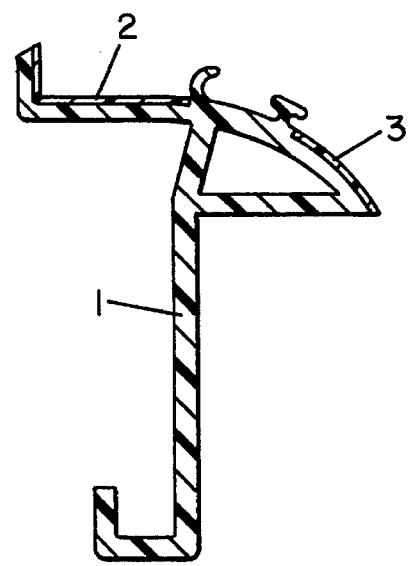
FIG. 2 is an enlarged cross sectional view thereof.

Rigid multilayer profiles can have any shape as formed from combining at least two thermoplastic process streams at least one stream comprising the appearance compound of this invention and another stream comprising the base layer. The base layer may have the appearance layer on only a portion of base layer surface, depending on the design sought. FIG. 1 illustrates an intricate profile shape in perspective view. Ridges and channels are shown. FIG. 2 illustrates a crossection of the profile of FIG. 1 and reference numerals 2 and 3 indicate two appearance layers which cover portions of the base layers surface. These appearance layers can be of the same composition and color or different.

Figure 3:
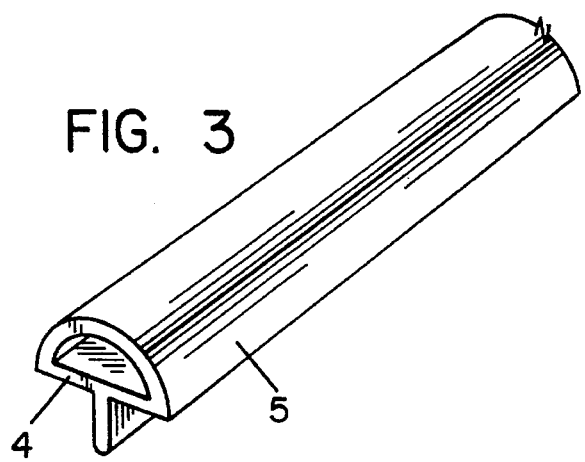
FIG. 3 is a perspective view of a second embodiment.
Figure 4:
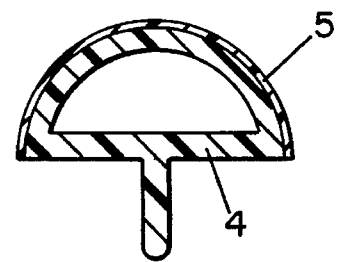
FIG. 4 is an enlarged cross sectional view thereof.
Figure 5:
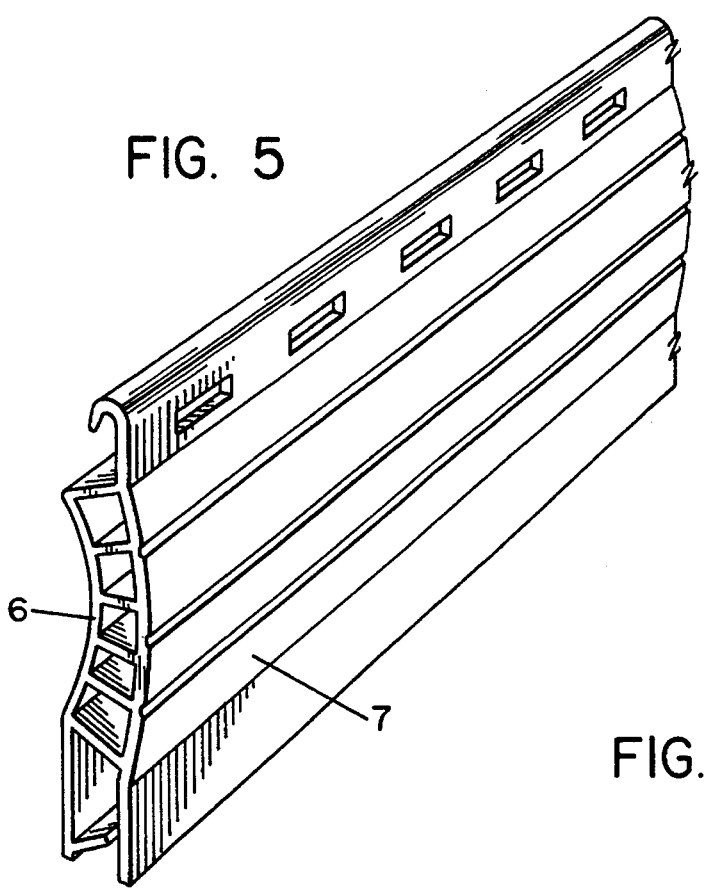
FIG. 5 is a perspective view of a third embodiment.
Figure 6:
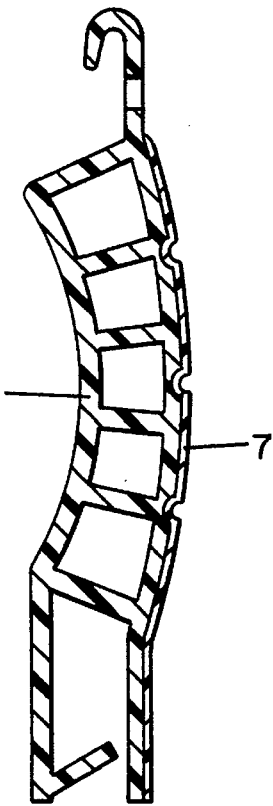
FIG. 6 is an enlarged cross sectional view thereof.

Reference 1 of FIG. 2 is illustrative of the base layer which can be clear, translucent or opaque. FIG. 3 illustrates a decorative profile of semi-circular shape in the appearance region. FIG. 4 illustrates a base element 4 made from a material such as metal, wood or plastic. Reference 5 of FIG. 4 illustrates an appearance layer made from an appearance polyvinyl chloride compound of this invention. FIGS. 5 and 6 illustrate another profile embodiment having a base layer (Reference 6) and appearance layer (Reference 7). The appearance layer covers a portion of the base layer component.

Figure 7:
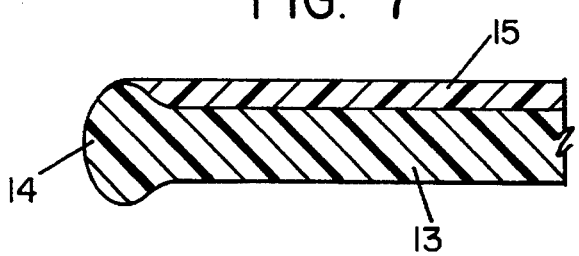
FIG. 7 is an enlarged cross sectional view of a 2-layered louver profile.
Figure 8:
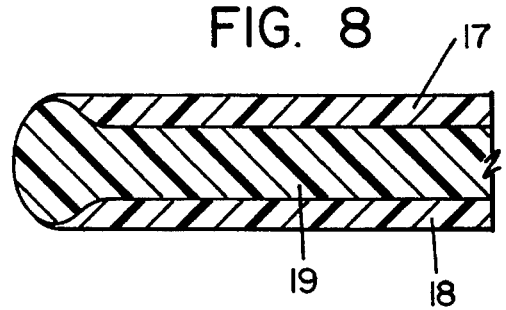
FIG. 8 is an enlarged crossectional view of a 3-layered louver profile.

FIG. 7 illustrates the lateral section of an exemplary louver. In FIG. 7, there is shown a base layer 13 having lateral edge 14. Lateral edge 14 on each side of the base layer 13 has a rounded or an elliptical cross section. The multilayer louver of FIG. 3 has upper layer 15 made with the appearance compound.

FIG. 4 depicts a multilayer louver having two appearance layers 17 and 18 surrounding an inner layer 19. One or both outer layers 17 and 18 may comprise the appearance layer having a polished metal look of the same or different shade.

Preferably the base layer 13 or 19 is opaque and of a light shade. The appearance layer has nacreous pigmentation, metal aluminum powder and optional dispersed organic or inorganic coloring pigments to provide a color shade desired. The invention requires a combination of powdered metal and pigment (s) dispersed in rigid polyvinyl chloride to form the appearance layer. Under extrusion conditions, for rigid PVC, sufficient orientation of both aluminum and pearlescent pigments is retained if the viscous melt is maintained under laminar flow. In the absence of either metal powder or nacreous pigment, the intended visual effect is not produced. Transparent tinting dyes are not as effective in providing coloration in the appearance layer therefore these are not preferred in providing added coloration to this layer. Opaque color pigments are more efficient in providing added coloration to the appearance layer, therefore these are preferred when used.

Nacreous pigmentation referred to here means pigment having pearlescent luster. Exemplary pearlescent pigments are disclosed in U.S. Pat. No. 4,084,983 such as titanium dioxide coated mica. Colored nacreous pigments are also exemplified by zirconium dioxide, iron oxide and oxides of nickel, cobalt, chromium or vanadium coatings on mica flakes. Such pigments are described, inter alia, in U.S. Pat. Nos. 3,437,515; 3,418,146; 3,087,828 and 4,038,099 incorporated herein by reference. Nacreous pigments containing absorbed dyes are disclosed in U.S. Pat. No. 4,968,351 incorporated herein by reference. The preferred nacreous pigments are titanium dioxide coated mica. The mica substrates on which metal oxide is layered generally have a length of about 1–75 microns, preferably about 5–35 microns, a thickness between about 0.03 and 3 microns and a specific surface area of about 1–6 $m^2g^{-1}$, preferably about 2–4.5 $m^2/g^{-1}$. Usually, the titanium dioxide or other metal surface has a thickness of about 2–350 millimicrons or such that it is incorporated at about 50 to 500 $mg/m^2$. Depending on the thickness of the metal oxide coating, the pigments can exhibit interference or reflection colors of blue, green, yellow, red, etc. A combination of micas can also be used, such as two micas differing in average particle size by at least 5 microns.

A variety of pearlescent pigments containing organic dyes affixed thereto are available. U.S. Pat. No. 4,084,983 teaches a laking reagent aluminum chloride, which, on hydrolysis, produced layers of aluminum hydroxide with which the dye is reacted to form the insoluble color lake thereby permitting it to deposit on the surface of the pigment. The aluminum hydroxide is alternatively, first deposited upon a platelet pigment surface. The reverse procedure is followed, i.e., the soluble dye is allowed to adsorb first on the platelet pigment surface, followed by the addition of a soluble aluminum or zirconium compound to form the corresponding hydroxide precipitate, which completes the laking reaction. Example commercial pearlescent pigments are available from The Mearl Corporation under the "Superwhite" trade name.

Metallic flake pigments are opaque to light. The substrate over which they are coated, or in the context of the present invention, extruded is completely occluded, however when using a limited amount of aluminum sufficient to hide the base layer, in combination with nacreous pigment, a bright metal finish is obtained. The metal finish can be shaded with organic pigments, darkened with carbon black or combined with pigmented $TiO_2$ treated mica or iron oxide coated mica to produce interference colors.

The aluminum flakes herein must be used at limited levels of from 0.05 to 4 parts by weight per 100 parts by weight of polyvinyl chloride in the appearance layer. Preferably 0.1 to 2 parts of aluminum flake per hundred parts of PVC resin are used. These powders are preferably dispersed as a wet cake in plasticizer such as DIDP. The amount of plasticizer is so small as to have no effect on the rigidity or melt viscosity of the rigid PVC resin. It is important to select aluminum flakes having a narrow particle size distribution and an average particle size of 50 microns or less, preferably, the average particle size is from 5 to 36 microns. Plugging of screen packs used in extrusion occurs in the use of larger than 50 microns particle size. Two types of aluminum flakes are available, those having a thin, flat shape and those having a more spheroidal shape. The spheroidal types are more durable under thermoplastic melt processing and are preferred. These spheroidal types are available from Silberline Manufacturing Co. Inc, Lansford, Pa. under the Silberline® or Silvex® trademark. The flattened irregular shaped flakes exhibit breakdown more readily under viscous shear conditions during melt processing, therefore these are not preferred. There is, however a narrow processing window for rigid PVC which will allow retention of the metallic effect, the methods are detailed below.

The appearance layer is made from an appearance compound based on thermoplastic rigid PVC, the PVC being the matrix resin in which the pigments-metal combination is dispersed. The preferred form of the multilayer profile therefore consists of two co-extruded, rigid PVC compounds. By rigid, it is meant that the flexural modulus is greater than 10,000 psi, and preferably greater than 100,000 psi. Typical opaque rigid vinyl compounds which are suitable for the base layer are GEON® 87408 and GEON® 87600 commercially available from The Geon Company, Cleveland, Ohio. These compounds consist essentially of 100 parts polyvinyl chloride polymer, and about 1–5 parts of thermal stabilizer, about 3–10 parts of processing aid, and about 1–5 parts of lubricant. The appearance layer comprises rigid PVC, stabilizer, lubricant, 0.1 to about 4 weight parts of aluminum powder, and an effective amount of nacreous pigment. Opacifying pigments must be absent or the appearance effect is lost.

A vast variety of coloring pigments and multiple combinations are employed in the art of shade matching. The selection of coloring pigments is beyond the scope of this disclosure. These may be used inorganic oxides based on Sb, Ti, or Cr or combinations of more than one of these or other metal oxides. Many suitable coloring pigments may be obtained from Ciba Geigy, Inc. or by reference to *The Chemical Chemical Week Buyers Guide* for 1992.

It has been previously disclosed a conventional pearlescent polyvinyl chloride compound based on a clear transparent vinyl compound suitable for a co-extruded outer layer of a vinyl based louver. This clear transparent pearlescent compound is designated as GEON® 87513-028. Other than the pearlescent pigmentation, no opacifying pigment is present in this compound and U.S. Pat. No. 4,877,077 teaches the requirement that none be present. This compound using nacreous pigment does not produce the polished metal look. The incorporation of aluminum powder in this transparent compound will produce the desired effect, however the presence of metal will cause the appearance layer to completely occlude the base layer. Surprisingly, the specular reflection of light at the surface retains the luster essential for the effect even though the base layer is completely occluded.

The preferred polyvinyl chloride polymers employed for any layers are homopolymers having an average molecular weight in terms of inherent viscosity of from 0.4 to 1.2 measured accordingly to ASTM-D 1243. The preferred inherent viscosity of PVC is from 0.5 to 0.75 for use with extrusion methods of manufacturing louver profiles. Polyvinyl chloride resin suitable for use herein is available from The Geon Company, Cleveland, Ohio. A bottle grade resin is most preferred.

It is also anticipated that the method of fabrication of profiles herein includes the extrusion of the appearance layer over a metal or plastic base layer such as an aluminum strip or commodity thermoplastic compound. The base layer is completely occluded and is not discernible through the opacified appearance layer. All of the anticipated variations of fabricating a multilayer louver with the appearance of polished metal containing the components specified herein can be reduced to practice with conventional laminating, injection molding, transfer molding, and extrusion. The compounding steps must maintain as low a shear and working as needed to achieve uniform dispersion and adequate fusion. For example in a Buss kneading pelletizer, at high speed, the residence time for mixing should be kept to about 15 seconds residence time. For brevity, the method of making the invention will be described by the preferred co-extrusion method and is not limitative on the method of making as reasonable trial and error effort and such variations and approaches are understood as within the scope of this invention.

The addition of sub-micron sized titanium dioxide in the appearance layer compound provides an enhanced special effect of color flopping. Submicron size means a crystal size of from 100–900 angstroms, preferably 150 to 300 angstroms. The enhancement lies in narrowing the angle deviation from the surface view angle wherein the color shift appears. Thus, when one views a louver blind assembly, the louvers directly in view appear of a different shade than those lying at the periphery of the view. The color flop enhancement also produces an aesthetic enhancement for curved slats. As one walks by the louver assembly and the viewing angle changes, a living color change appears which is striking. Micronized $TiO_2$ is available from Tioxide of Canada or Teikoku Co., Ltd, Osaka Japan.

EXAMPLE

An appearance compound containing the components listed below was uniformly mixed in a Henschel high intensity mixer until uniform with the delayed addition of metallic and pearlescent pigments. Mixing was stopped when a uniform dry powder was obtained. The powder mixture was fed into a Buss Condux Kneader and pelletized. Residence time in the Buss must be minimized.

| Appearance Layer Component | Weight Parts |
|---|---|
| PVC[1] (0.68 I.V.) | 100 |
| Acrylic Process aid | 1.75 |
| Epoxidized Soy oil | 5.0 |
| Stabilizer[2] | 1.8 |
| Aluminum[3] | 0.5 |
| Aluminum[4] | 0.6 |
| Stearic Acid | 0.5 |
| MBS impact modifier | 6 |
| Oxidized Polyethylene Wax | 0.15 |
| Paraffin wax | 0.05 |
| Pearl (Afflair® 235)[5] | 0.1 |
| Pearl (Afflair® 135)[5] | 0.1 |
| Red[6] | .04 |
| Blue[6] | .18 |
| Magenta[6] | .05 |
| Black[7] | .25 |

[1]Film grade suspension PVC
[2]Dimethyltin diisoctyl thioglycolate
[3]Aluminum Flake (Silvex ® 540 Series) 39μ particle size
[4]Aluminum flake (Sparkle Silvex ®) 21μ particle size
[5]Available from EM Industries, Hawthorne, NY
[6]Available from Ciba Geigy, Inc.
[7]Available from Cabot Corp.

Pellets of the above compound were separately fed into a coextruder along with a separate charge of a base layer pellet compound. The co-extruder was equipped with slotted co-extrusion dies, having internal passages which provide for combining of the layers before the hot extrudates reach the die tips under laminar melt flow. The surface appearance of this louver was a gun metal gray. A slotted die can be fabricated by anyone skilled in that art and utilized in a conventional manner on conventional extrusion equipment. Therefore a detailed discussion of this componentry is beyond the scope of the present disclosure.

Those skilled in the art will recognize that the multilayer extrudates of this invention may also be fabricated by a calendaring process. In this process generally a fluxed compound is fed to a calendar stack. Typically, an extended high shear environment for the appearance layer should be avoided.

Various changes and modifications may be made in carrying out the present invention without departing from the spirit and scope thereof. Insofar as these changes are within the purview of the appended claims, they are to be considered as part of the invention.

It is claimed:

1. A multilayer profile in the shape of a louver blind and exhibiting a bright polished metal visual effect, comprising joined first and second layers, wherein the first layer is a rigid base layer, and the second layer is an extruded rigid appearance layer exhibiting said polished metal effect, said appearance layer is absent particulate opacifying pigment, and comprises rigid polyvinyl chloride, powdered aluminum metal flakes, and from 0.05 to 10 weight parts nacreous (pearlescent) pigmentation, wherein said powdered aluminum metal flakes have a average particle size of 50 microns or less and said flakes are present at from 0.05 to 4 weight parts per 100 weight parts of said polyvinyl chloride.

2. The profile of claim 1 further comprising a third layer in contact with said base layer.

3. The profile of claim 1 wherein said base layer is opaque, rigid polyvinyl chloride, and comprises PVC resin, filler, stabilizer and lubricant.

4. The profile of claim 1 wherein said powdered aluminum metal flakes are present at from 0.05 to 2 weight parts per 100 weight parts of polyvinyl chloride, and said nacreous pigment is present at from 0.1 to 2 weight parts per 100 parts polyvinyl chloride.

5. The profile of claim 4 wherein said powdered aluminum metal flakes have an average particle size of from 5 to 36 microns and is present at from 0.1 to 2 weight parts per 100 weight parts of polyvinyl chloride.

6. The profile of claim 5 further comprising other powdered aluminum metal flakes having an average particle size of at least 5 microns larger or smaller than said particle size of said powdered aluminum metal flakes.

7. A multilayer profile of claim 1 wherein the appearance layer further comprises one or more organic coloring pigments.

8. A multilayer profile of claim 5 wherein said appearance layer contains from 0.1 to 2 weight parts of nacreous pigment which contains one or more affixed organic dyes.

9. A multilayer profile in the shape of a louver blind comprising joined first and second layers, said first layer is a rigid base layer and said second layer is an extruded rigid appearance layer exhibiting a polished metal effect said appearance layer is absent particulate opacifying pigment said second layer comprises 100 weight parts of polyvinyl chloride, from 0.05 to 4 weight parts of aluminum flakes having an average particle size of 50 microns or less, from 0.05 to 10 weight parts of a nacreous (pearlescent) pigment, and titanium dioxide pigment having a crystal size of from 100 to 900 angstroms.

\* \* \* \* \*